J. W. Weston,
Fruit Basket,
No. 83,678.   Patented Nov. 3, 1868.
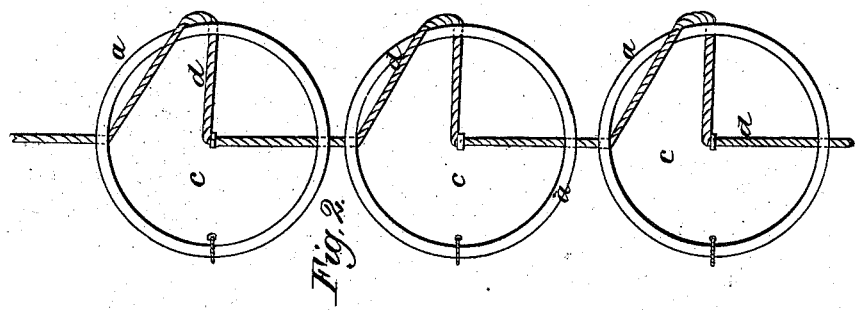
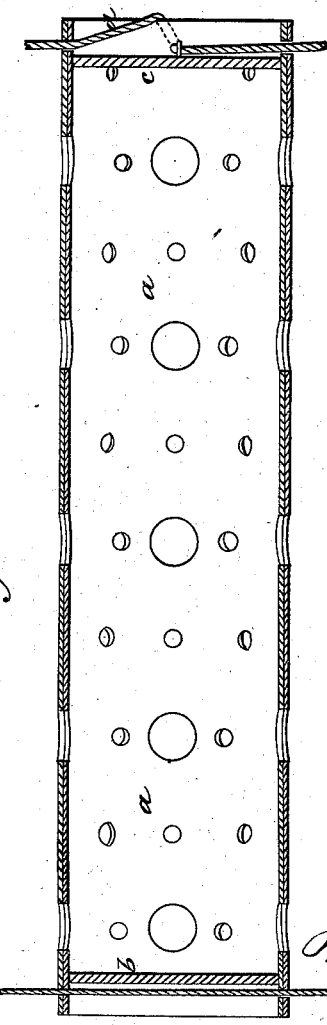
Witnesses.
Geo. D. Walker
Chas. H. Smith.
Inventor.
James W. Weston,
per L. W. Serrell
Atty.

United States Patent Office. 

JAMES W. WESTON, OF NEW YORK, N. Y.

Letters Patent No. 83,678, dated November 3, 1868; antedated October 17, 1868.

IMPROVED FRUIT-CARRIER.

The Schedule referred to in these Letters Patent and making part of the same.

*To all whom it may concern:*

Be it known that I, JAMES W. WESTON, of the city and State of New York, have invented and made a certain new and useful Improvement in Fruit-Carriers; and I do hereby declare the following to be a full, clear, and exact description of the said invention, reference being had to the annexed drawing, making part of this specification, wherein—

Figure 1 is a section of one of said fruit-carriers, and

Figure 2 is an end view representing three of said fruit-carriers together.

Similar marks of reference denote the same parts.

Heretofore fruit has usually been carried in baskets, and, with berries, the weight of the upper frequently injures the lower ones, and there is often considerable motion allowed to heavier fruit, such as peaches, that causes them to become bruised, as they are placed together in baskets.

The nature of my said invention consists in a cylindrical fruit-carrier, formed with perforated sides, to allow of ventilation, and with one end closed, and the other provided with a movable cover, so that the fruit can be placed in such cylinder, and securely retained therein, and then said cylinder can be transported in a horizontal position; thereby there will be little or no pressure of the fruits one on the other; and a series of these cylinders can be secured together by a wire, string, or other article, passed through their ends, so that they may be suspended, or a series of them may be packed together in a frame, box, or hoop, for convenience of transportation, under all circumstances the interstices between the cylinders allowing free ventilation.

In the drawing, *a* represents a cylinder, of any desired size or material, formed with a number of perforations throughout the entire length.

For berries, I prefer to form these cylinders of veneers of wood, but for peaches they may be formed of pasteboard.

The fixed head, *b*, is secured into one end of the cylinder *a*, by gluing, or in any other convenient mode, and at the other end the movable head, *c*, is united by a hinge, so as to be easily opened for the introduction of the fruit.

The ends of the cylinders should project beyond the heads, so as to allow a string, wire, or other device for connecting a series of these fruit-carriers together to be employed, the same passing through the cylinder, outside the head, as seen at *d*, so as to render the heads more secure, as well as connecting several of these cylinders together for convenience in handling.

If desired, the perforated cylinder might be divided up into smaller sections by longitudinal divisions.

What I claim, and desire to secure by Letters Patent, is—

A fruit-carrier, formed of a perforated cylinder, fitted with heads that are retained in place by the cords that suspend the carrier horizontally, as and for the purposes set forth.

In witness whereof, I have hereunto set my signature, this 25th day of March, A. D. 1868.

J. W. WESTON.

Witnesses:
GEO. D. WALKER,
CHAS. H. SMITH.